(12) United States Patent
Lady (10) Patent No.: US 9,456,586 B1
(45) Date of Patent: *Oct. 4, 2016

(54) ANIMAL TRAINING HARNESS

(71) Applicant: Linda J. Lady, Fremont, CA (US)

(72) Inventor: Linda J. Lady, Fremont, CA (US)

(73) Assignee: LML HOLDINGS, INC., Union City, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/524,642

(22) Filed: Oct. 27, 2014

Related U.S. Application Data (63) Continuation-in-part of application No. 12/818,595, filed on Jun. 18, 2010, now Pat. No. 8,869,750, which is a continuation of application No. 12/107,049, filed on Apr. 21, 2008, now Pat. No. 7,886,699, which is a continuation of application No. 11/456,821, filed on Jul. 11, 2006, now Pat. No. 7,387,087, which is a continuation of application No. 10/341,930, filed on Jan. 14, 2003, now Pat. No. 7,107,939.

(60) Provisional application No. 60/392,746, filed on Jun. 27, 2002.

(51) Int. Cl.
*A01K 27/00* (2006.01)
*A01K 15/02* (2006.01)

(52) U.S. Cl.
CPC ............ *A01K 27/002* (2013.01); *A01K 15/02* (2013.01)

(58) Field of Classification Search
CPC .. A01K 27/002; A01K 27/003; A01K 27/00; A01K 27/005; A01K 1/0263; Y10S 119/907; Y10S 119/905; A47D 13/086
USPC ....... 119/792, 856, 793, 794, 786, 787, 788, 119/771, 863, 864, 905, 907; 54/71
See application file for complete search history.

(56) References Cited

U.S. PATENT DOCUMENTS

| | | | | |
|---|---|---|---|---|
| 2,994,300 A | * | 8/1961 | Grahling | A01K 27/005 119/770 |
| 4,667,624 A | * | 5/1987 | Smith | A01K 27/00 119/770 |
| 5,038,717 A | * | 8/1991 | Bent | A01K 15/02 119/815 |
| 5,243,931 A | * | 9/1993 | McDonough | A01K 27/002 119/671 |
| 5,279,386 A | * | 1/1994 | Cearley | A62B 35/0031 119/907 |
| 5,383,426 A | * | 1/1995 | Krauss | A01K 27/002 119/793 |
| 5,433,688 A | * | 7/1995 | Davies | A63B 21/0552 482/124 |
| 5,503,113 A | * | 4/1996 | Knight | A01K 27/005 119/792 |
| 5,682,840 A | * | 11/1997 | McFarland | A01K 27/002 119/792 |
| 5,724,920 A | * | 3/1998 | Meisman | A01K 27/003 119/771 |
| 5,732,663 A | * | 3/1998 | Manzella | A01K 27/005 119/798 |
| 5,842,444 A | * | 12/1998 | Perrulli | A01K 27/003 119/770 |

(Continued)

*Primary Examiner* — Yvonne Abbott-Lewis
(74) *Attorney, Agent, or Firm* — Peters Verny, LLP (57) ABSTRACT

An animal training apparatus is comprised of a leash connector attached to a chest portion of a harness. The harness is arranged to prevent the leash connector from shifting to the back of the animal. The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside. The leash connector is attached to an intermediate position on the chest strap for pulling on the chest portion of the harness. The animal is prevented by the rotational force from pulling further.

15 Claims, 10 Drawing Sheets

(56) References Cited

U.S. PATENT DOCUMENTS

| | | | | |
|---|---|---|---|---|
| 5,873,328 A * | 2/1999 | Campbell | A01K 27/005 | 119/795 |
| 5,915,335 A * | 6/1999 | Holt, Jr. | A01K 1/0263 | 119/770 |
| 6,085,694 A * | 7/2000 | Simon | A01K 27/002 | 119/792 |
| 6,095,094 A * | 8/2000 | Phillips | A01K 27/001 | 119/792 |
| D434,535 S * | 11/2000 | Koch | D30/152 | |
| 6,374,778 B1 * | 4/2002 | Glussich | A01K 27/006 | 119/859 |
| 6,397,783 B1 * | 6/2002 | Koch | A01K 27/00 | 119/792 |
| 6,401,666 B1 * | 6/2002 | Kircher | A01K 27/002 | 119/792 |
| 6,450,129 B1 * | 9/2002 | Flynn | A01K 27/00 | 119/770 |
| 6,662,753 B1 * | 12/2003 | Sporn | A01K 27/003 | 119/797 |
| 6,679,198 B1 * | 1/2004 | LaGarde | A01K 15/02 | 119/792 |
| 6,694,923 B1 * | 2/2004 | Fouche | A01K 27/005 | 119/792 |
| 6,773,366 B2 * | 8/2004 | Gray | A63B 21/0004 | 473/409 |
| D511,596 S * | 11/2005 | Mugford | D30/152 | |
| 7,886,699 B2 * | 2/2011 | Lady | A01K 27/002 | 119/792 |
| 2006/0037562 A1 * | 2/2006 | Woerner | A01K 27/008 | 119/856 |
| 2006/0054109 A1 * | 3/2006 | Smith | A01K 1/0263 | 119/856 |
| 2006/0102102 A1 * | 5/2006 | Bennett | A01K 27/002 | 119/792 |
| 2007/0034164 A1 * | 2/2007 | Sporn | A01K 27/002 | 119/856 |
| 2008/0105216 A1 * | 5/2008 | Sporn | A01K 27/002 | 119/863 |
| 2009/0000570 A1 * | 1/2009 | Ashby | A01K 27/002 | 119/858 |
| 2009/0044763 A1 * | 2/2009 | Russo | A01K 27/003 | 119/770 |
| 2010/0294213 A1 * | 11/2010 | Vaccari | A01K 27/001 | 119/863 |
| 2013/0327280 A1 * | 12/2013 | Thalmann | A01K 27/009 | 119/719 |
| 2015/0114311 A1 * | 4/2015 | Lynch | A01K 27/002 | 119/792 |

\* cited by examiner

ANIMAL TRAINING HARNESS

CROSS-REFERENCE TO RELATED APPLICATIONS

This application is a continuation-in-part of, and claims the priority benefit of, co-pending U.S. patent application Ser. No. 12/818,595 filed Jun. 18, 2010 which is a continuation of U.S. patent application Ser. No. 12/107,049 filed Apr. 21, 2008, now U.S. Pat. No. 7,886,699 which is a continuation of U.S. patent application Ser. No. 11/456,821 filed Jul. 11, 2006, now U.S. Pat. No. 7,387,087, which is continuation of U.S. patent application Ser. No. 10/341,930 filed Jan. 14, 2003, now U.S. Pat. No. 7,107,939, which claims priority from the provisional U.S. Patent Application No. 60/392,746 filed Jun. 27, 2002. The disclosures of the above applications are incorporated herein by reference.

BACKGROUND

1. Field of the Invention

The invention broadly relates to animal harnesses and leashes.

2. Prior Art

An animal leash is typically connected to a collar worn around the neck of an animal. The collar is free to rotate around the neck. An animal, such as a dog, that has not been trained, instinctively wishes to roam away from its handler. When the dog tries to walk or run away and pulls the leash taut, the collar is automatically rotated so that the leash is positioned at the back of the neck. As the dog pulls the leash taut, it feels pressure on the front of its neck.

Many types of animals have an opposition reflex that makes them instinctively move toward the part of their bodies on which they feel pressure. Since the dog feels pressure at the front part of the collar when he pulls on a leash that has been rotated to the back, the collar encourages the dog to pull away from its handler with even greater force. As another example, the opposition reflex of a horse causes it to turn towards the side where the rider's leg applies pressure.

In addition to collars, there are animal harnesses that wrap around the torso. A typical harness has a leash attachment at the back of the animal, but a back-mounted leash cannot be used to give the animal cues for learning commands such as sit, down, and come. The back-mounted leash also signals the animal to pull on the leash, similar to a neck collar, because of the pressure on the front of the chest when the animals pulls the leash taut. Some prior art harnesses discourage pulling behavior by providing devices that rub, chafe, or hobble the animal's front legs, but these devices cause stress and discomfort.

SUMMARY

Accordingly, the objects of the present animal training apparatus and method are:
  to prevent an animal from pulling on its leash;
  to facilitate applying turning signals to the animal;
  to give an animal cues for learning commands such as sit, down, and come;
  to be adjustable for fitting different size animals;
  to be comfortable to wear;
  to not rub the armpits or forearms; and
  to enable the animal to walk freely without hobbling its movements.

The present invention is an animal training apparatus that is comprised of a leash connector attached to a chest portion of a harness. The harness is arranged for preventing the leash connector from shifting to the back of the animal.

The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside.

The leash connector is attached to an intermediate position on the chest strap for controlling an animal by pulling the chest strap in the appropriate direction. For example, it can apply a rotating force to the animal when the animal moves forwards of the handier and pulls on the leash connector. The animal is prevented by the rotational force from pulling further.

By this design, when the animal brings the leash taut, it is not encouraged to pull further by pressure on the chest, but is instead is encouraged to turn toward the desired direction by pressure on the sides, thereby preventing pulling.

Various embodiments of the invention include an apparatus. The apparatus optionally being for animal training and comprising: a chest strap configured to be positioned across a forechest of an animal across its shoulders; a back strap configured to be positioned across a back of the animal at or behind its shoulders; a girth strap configured to be positioned across a girth of the animal behind the front legs on an underside of the animal, wherein respective opposite ends of the chest strap, the back strap, or the girth strap are connected together on each of the right and left sides of the animal and the straps are of such relative length so as to place the connections at or behind the shoulders of the animal; a leash connector attached to an intermediate position of the chest strap and configured for applying a rotational force to the shoulders of the animal when the animal moves forwards of a handler and pulls on the leash connector; and a neck strap configured to be positioned across the neck of the animal and to be connected to the chest strap.

Various embodiments of the invention include an apparatus, comprising: a chest strap configured to be positioned across a forechest of an animal across its shoulders; a back strap configured to be positioned across a back of the animal at or behind its shoulders; a girth strap configured to be positioned across a girth of the animal behind the front legs on an underside of the animal, wherein respective opposite ends of the chest strap, the back strap, and the girth strap are coupled together; a leash connector attached to an intermediate position on the chest strap and configured for attachment of a leash; and a neck strap configured to be positioned across the neck of the animal and to support the chest strap.

Various embodiments of the invention include an apparatus comprising: a harness configured to be attached proximate to the shoulders of an animal; and a leash connector attached to the harness such that the leash connector is disposed proximate to the chest of the animal below the neck and forward of the forelegs of the animal, the leash connector being prevented from moving above the neck of the animal by the harness, the leash connector being prevented from moving behind the forelegs of the animal by the harness, the leash connector being prevented from moving below the forechest of the animal by the harness, the harness being configured to apply pressure to the shoulders of the animal in response to tension on a leash connected to the leash connector.

Various embodiments of the invention include an apparatus comprising: a forechest strap configured to extend from a first connection to a second connection and to be positioned across a chest of an animal between a neck and front legs of the animal; a withers strap configured to extend from the first connection to the second connection and to be positioned across a withers of the animal behind the neck of the animal; a girth strap configured to extend from the first connection to the second connection and to be positioned across a girth of the animal behind the front legs of the animal, the first and second connections being vertically adjustable by independently changing lengths of both the withers strap and the girth strap, the first and second connections being horizontally adjustable by changing a length of the forechest strap; a neck strap configured to be positioned across the neck of the animal and to support the forechest strap; and a leash connector operatively coupled to the forechest strap and configured to connect a leash to the forechest strap.

Various embodiments of the invention include an apparatus, comprising: a chest strap configured to be positioned across a forechest of an animal across its shoulders; a back strap configured to be positioned across a back of the animal at or behind its shoulders; a girth strap configured to be positioned across a girth of the animal behind the front legs on an underside of the animal, wherein respective opposite ends of the chest strap, the back strap, and the girth strap are coupled together; a first leash connector attached to an intermediate position on the chest strap and configured for attachment of a leash; and a second leash connector attached to the chest strap between the first leash connector and an end of the chest strap. The apparatus optionally including padding attached to the chest strap.

DETAILED DESCRIPTION

Figure 1:
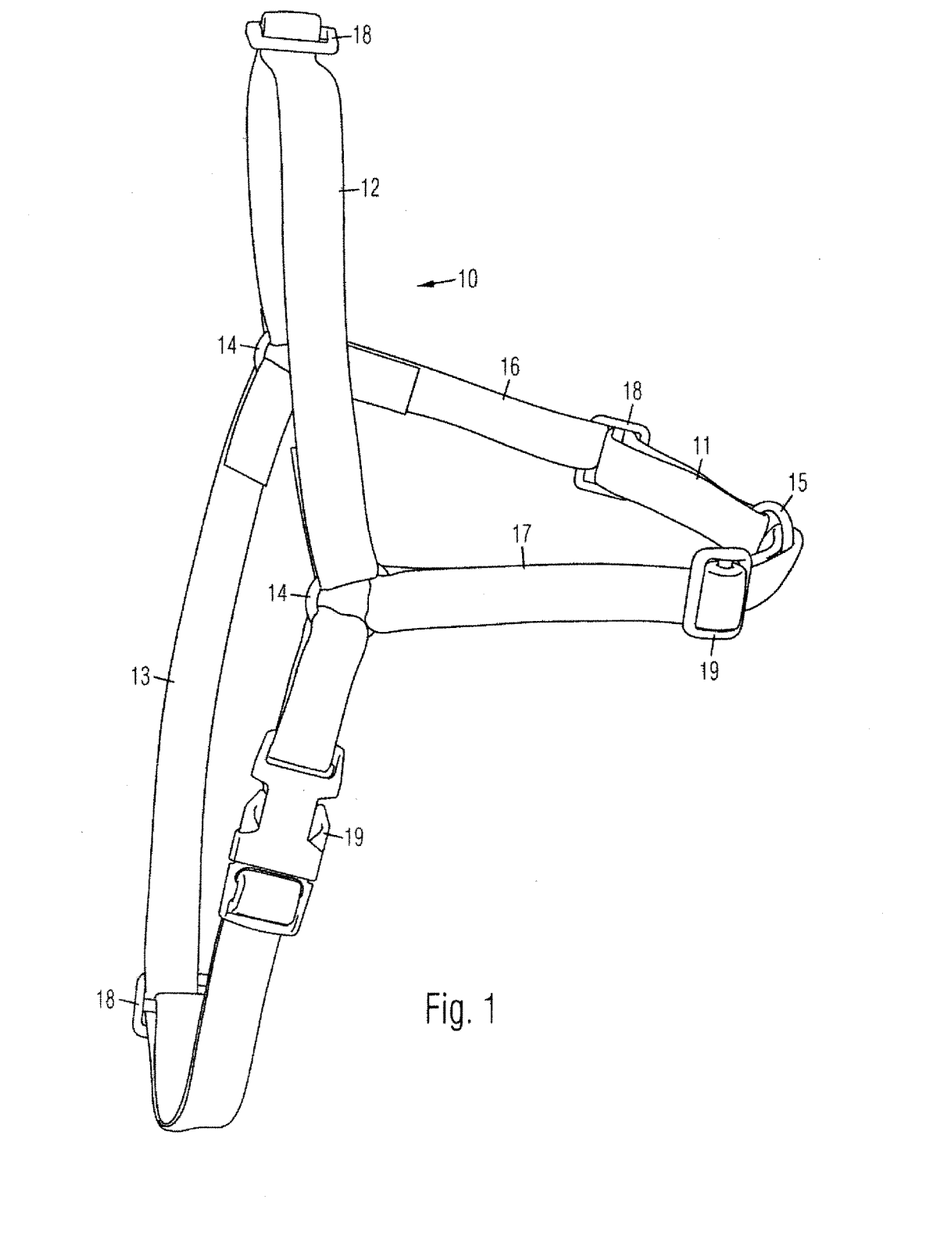
FIG. 1 is a side perspective view of the present invention.

In accordance with a first embodiment of the invention shown in the front view of FIG. 1, an animal harness (10) is comprised of a chest strap (11), a withers (back) strap (12), and a girth strap (13), which are preferably made of webbing. Adjacent ends of the straps (11-13) are connected together, preferably by side connectors (14), which are preferably comprised of rings that allow the chest strap (11) to pivot up and down. Alternatively, the ends of the straps (11-13) may be connected together without a connector, such as by sewing, gluing, or other means, or they may be integrally connected to each other.

A leash connector (15) is attached to an intermediate position on the chest strap (11). In this example, the chest strap (11) is comprised of a left strap (16) and a right strap (17) connected by the leash connector (15), which is comprised of a ring. Alternatively, the chest strap (11) may be comprised of a single strap, and the leash connector (15) may be attached to an intermediate position or any other position on the single strap. Also, the leash connector (15) may be any suitable type of connector for connecting to a leash. There may be a plurality of leash connectors on the chest strap (11).

The withers strap (12) and the girth strap (13) each includes at least one length adjuster (18), such as a slide buckle, for adjusting its length to fit different size animals. The chest strap (11) preferably includes two width adjusters (18) on either side of the leash connector (15), so as to enable adjusting the length of the chest strap (11), and preferably maintaining the leash connector (15) generally centered along the chest strap (11). Alternatively, the length adjusters (18) may be eliminated and the straps (11-13) may be sized to fit an animal of a predetermined size.

A releasable connector (19) is attached along one of the straps (11-13), preferably a girth strap (13). An identification tag (not shown) or a cord (not shown) may be attached to the leash connector (15) for connecting a leash.

Figure 2:
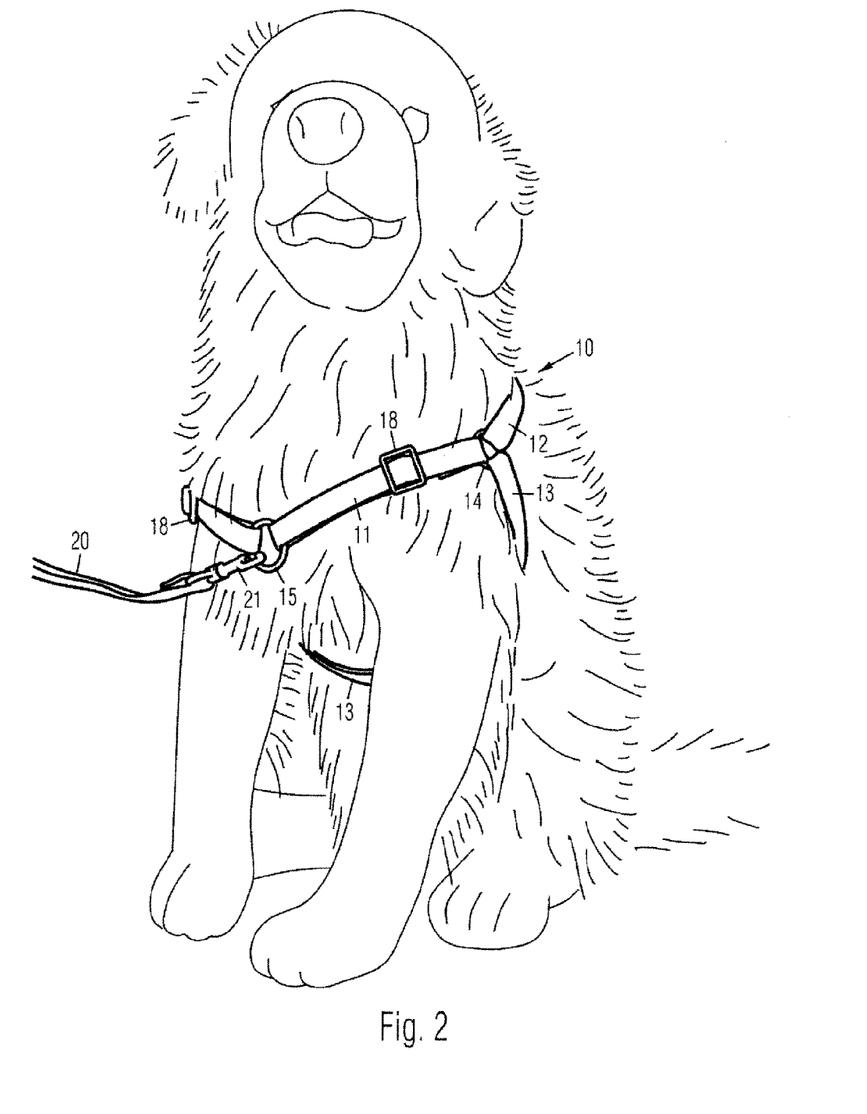
FIG. 2 is a front perspective view of the invention on an animal.
Figure 3:
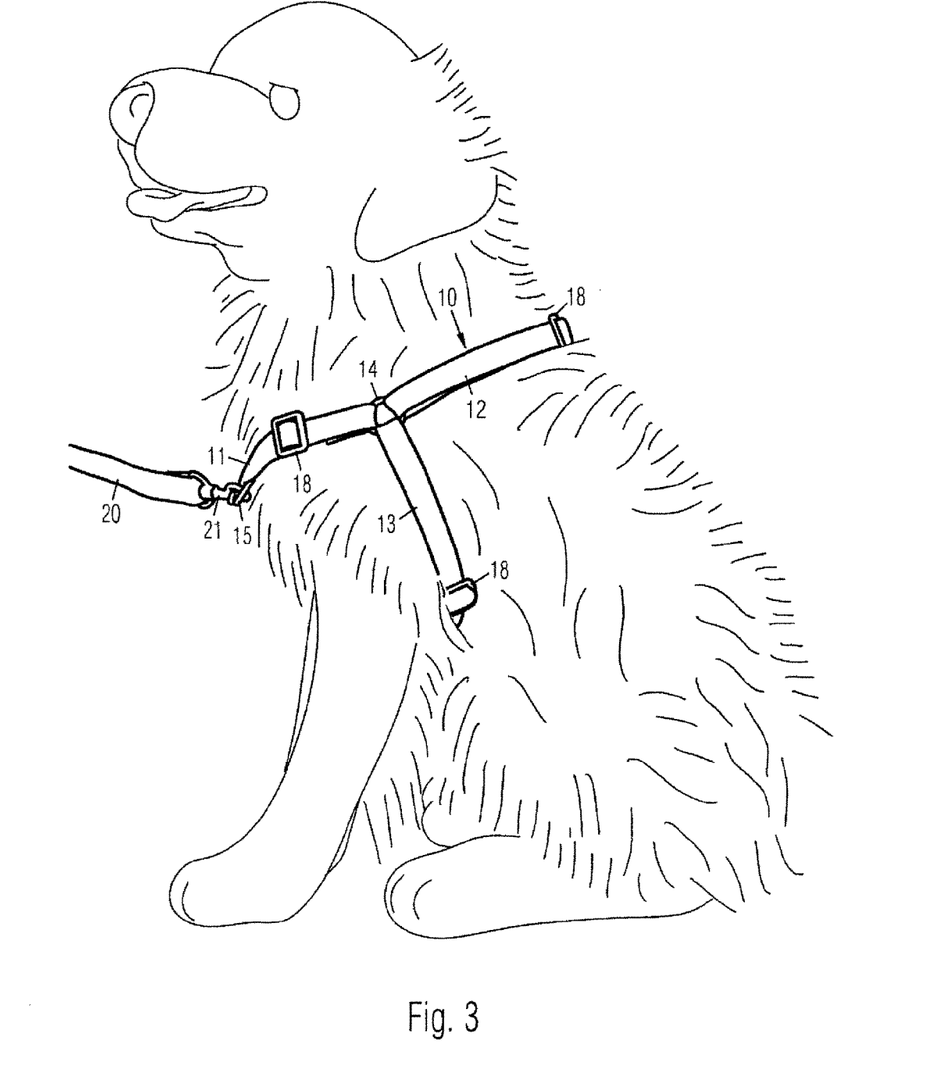
FIG. 3 is a side view of the invention on the animal.

In FIGS. 2 and 3, a harness (10) is shown worn on animal, which is a dog in this example. The harness (10) is most suitable for dogs, but it may be used for other four legged animals. A releasable connector (19) (FIG. 1) is disconnected for enabling the harness (10) to be put on the animal by sliding the chest strap (11) and the withers strap (12) down around its neck without lifting its legs. The releasable connector (19) is reconnected after the chest strap (11) and the withers strap (12) are in position. The chest strap (11) is positioned across the animal's chest, which is the portion between the tops of the front legs. The withers strap (12) is positioned across the withers, which is the portion between the shoulders behind the neck. The girth strap (13) is positioned across the girth, which is the portion on the underside behind the front legs. A leash (20) with a releasable connector (21) at the proximal end is connected to the leash connector (15) on the chest strap (11).

Length adjusters (18) on the straps (11-13) are adjusted to fit the animal. Side connectors (14) are generally positioned at the shoulders where the animal can easily feel them for receiving turning signals. The chest strap (11) is preferably adjusted to be loose enough for pivoting up and down about side connectors (14). The harness (10) is comfortable to wear because it may be worn relatively loosely, and because it does not rub the armpits or forearms like some prior art harnesses do. Accordingly, it allows the animal to walk freely without hobbling its movements.

Figure 4:
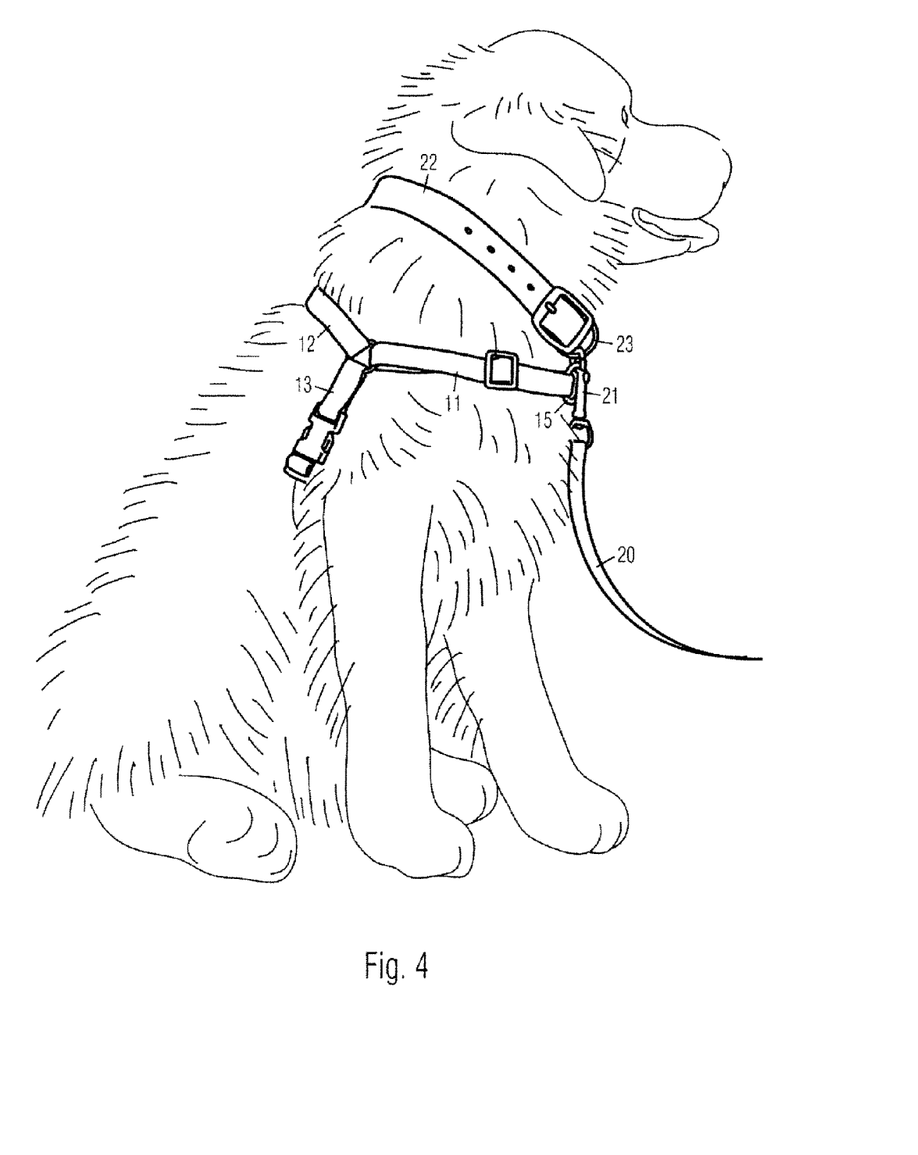
FIG. 4 is a side view of an alternative embodiment of the invention.

An alternative embodiment of the harness is shown in FIG. 4. It includes a collar (22) worn above a chest strap (11) and a withers strap (12). A leash connector (23) on collar (22) is connected to a leash connector (15) on the chest strap (11) by releasable connector (21) on the leash. The collar (22) provides additional control and signaling, as well as enabling an easier transition for an animal owner who is accustomed to using a collar alone. When the owner is familiar with using the harness, the collar (22) may be removed.

Figure 5:
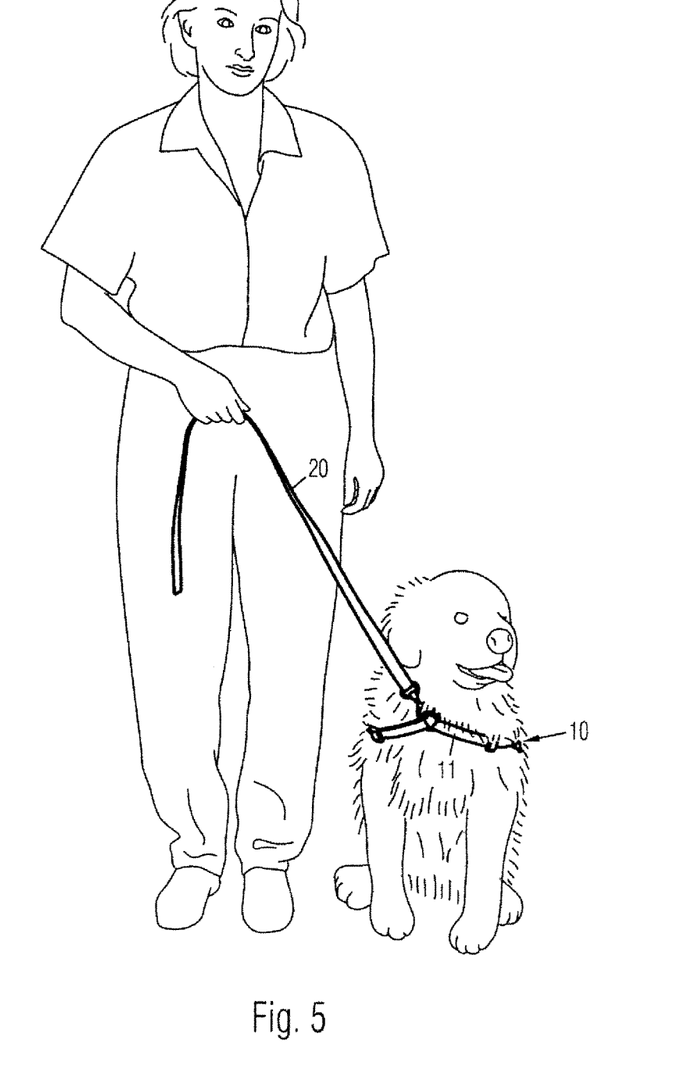
FIG. 5 is a front view of the invention when the animal is being instructed to proceed forward.
Figure 6:
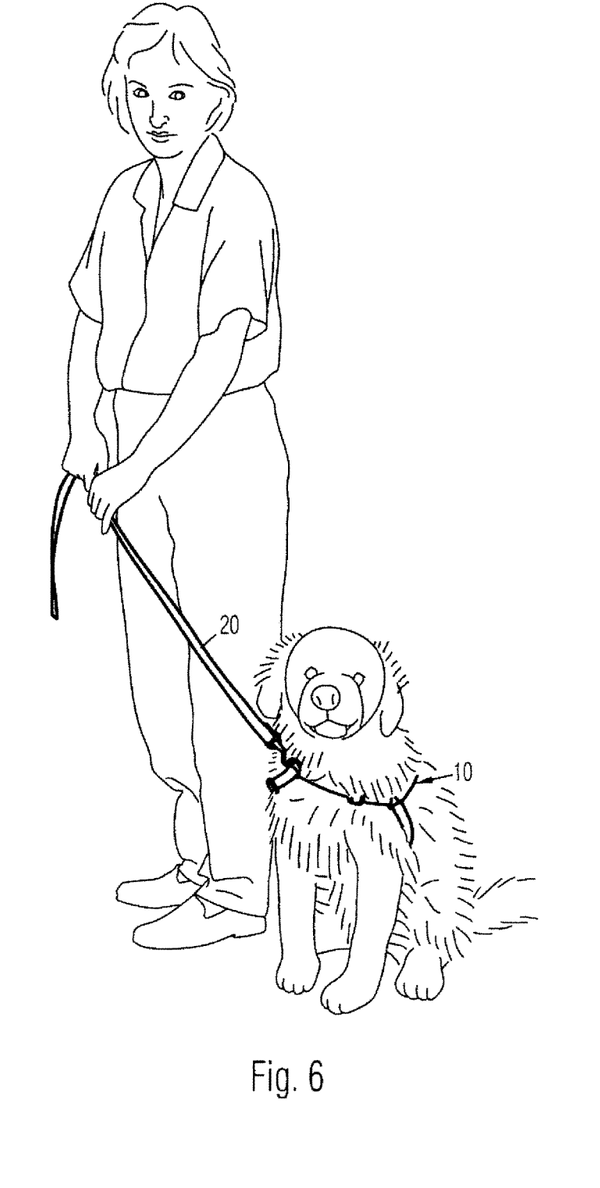
FIG. 6 is a front view the invention when the animal is being instructed to turn right.
Figure 7:
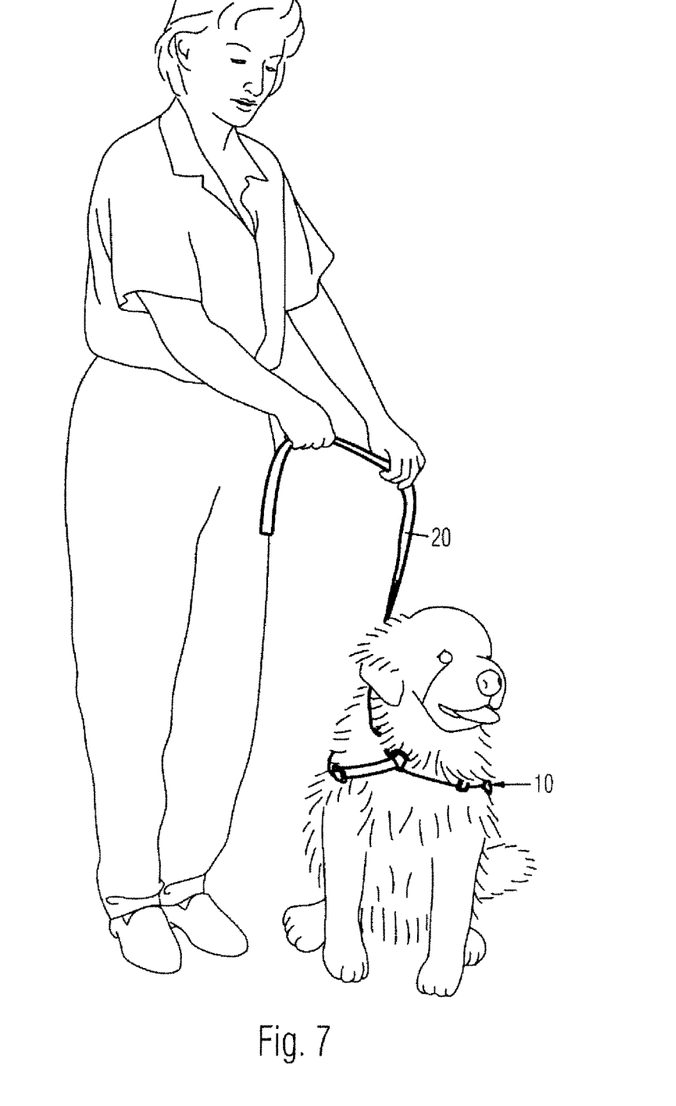
FIG. 7 is a front view invention when the animal is being instructed to turn left.

A method for training the animal wearing a harness (10) is shown in FIGS. 5-7. As an example, a trainer is shown on the right of the animal, but the trainer may be on the left instead.

In FIG. 5, the animal is instructed to proceed forward by pulling a leash (20) forward to apply pressure on the animal's withers and girth. If the animal moves forwards of the trainer and pulls the leash (20) taut, the leash connector (15) (FIG. 1) and the leash (20) apply a force to the sides and shoulders of the animal to produce a rotational effect on the animal since the leash connector (15) and the leash (20) are attached to the chest strap (11). The animal is signaled to turn toward the trainer and stopped from pulling on the leash (20).

The harness (10) eliminates the signals that prior art leashes and harnesses provide to cause the animal to pull on the leash (20). The animal will quickly learn to walk with the trainer instead of forcing its way ahead and pulling on the leash (20). The animal is instructed to sit or to stop walking by pulling the leash (20) upward to apply pressure on the animal's girth.

In FIG. 6, the animal is instructed to turn right by pulling the leash (20) to the right to apply pressure to the animal's left shoulder. In FIG. 7, the animal is instructed to turn left by pulling the leash (20) to the left to apply pressure to the right side of the animal's neck. If the animal is on the trainer's right side, the animal is instructed to turn right by pulling the leash (20) to the right to apply pressure to the left side of the animal's neck.

Figure 8:
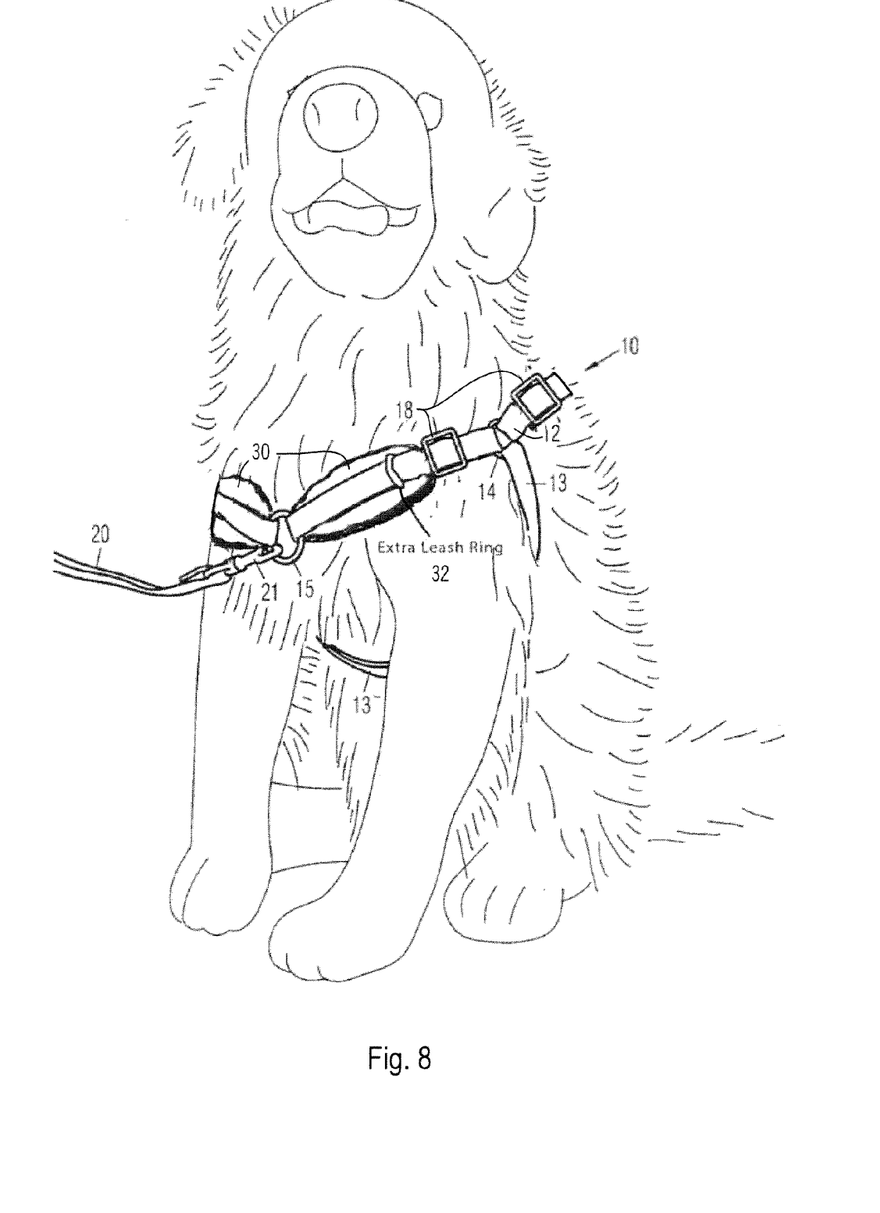
FIG. 8 is a front perspective view of a training apparatus on an animal, according to an exemplary embodiment of the invention.
Figure 9:
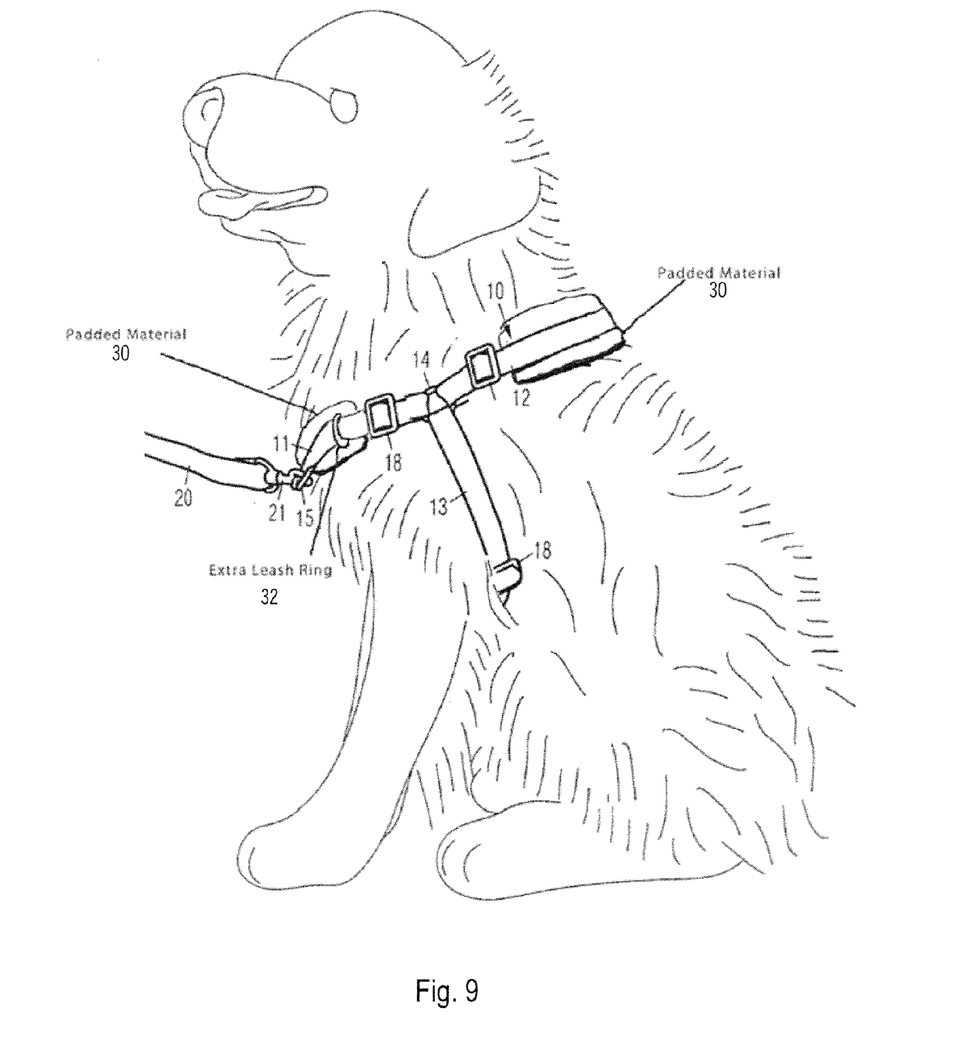
FIG. 9 is a front perspective view of a training apparatus on an animal, according to another exemplary embodiment of the invention.
Figure 10:
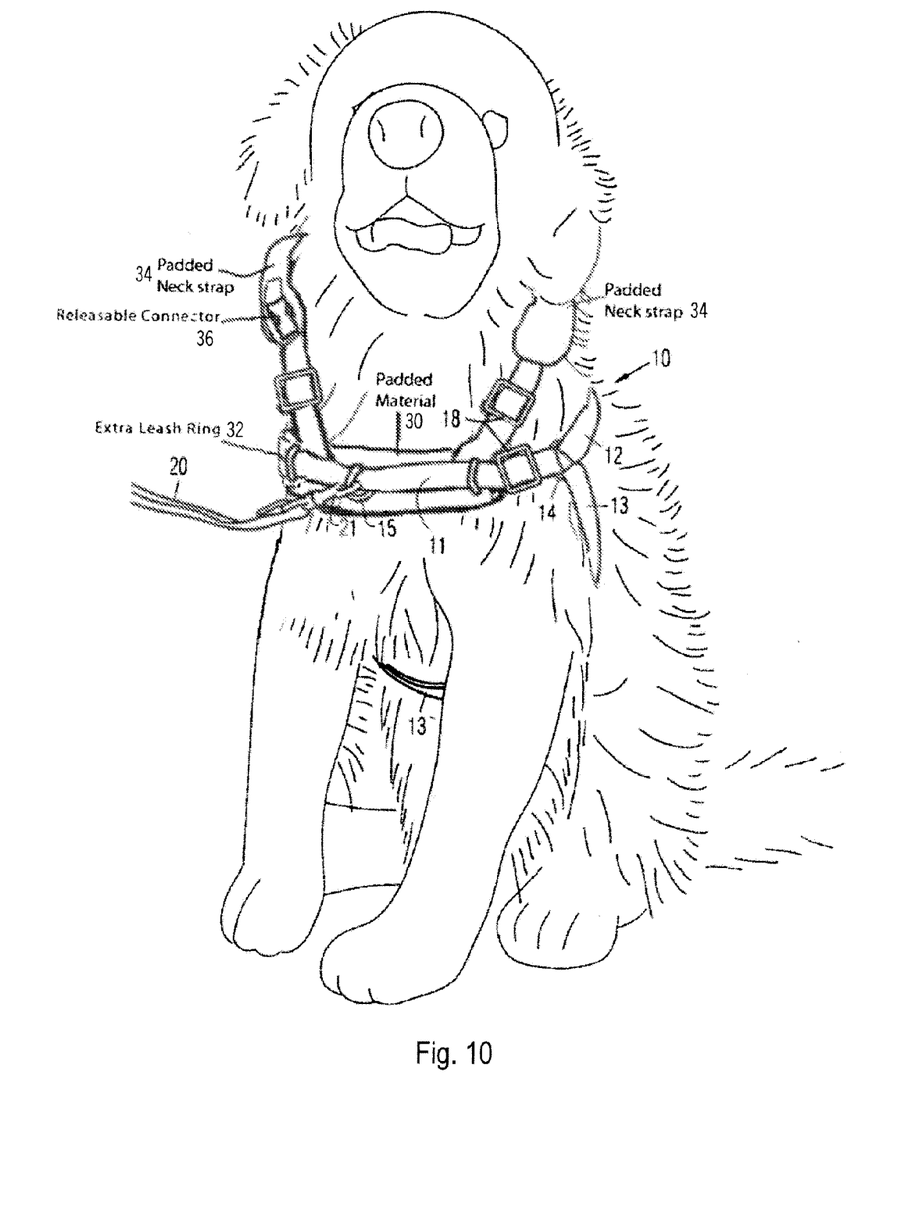
FIG. 10 is a side view of a training apparatus on an animal, according to a further exemplary embodiment of the invention.

FIGS. 8-10 illustrate additional exemplary embodiments of the present invention. Some of these embodiments offer padding to essentially widen a center portion of the chest (forechest) strap (11) and/or to widen the withers (back) strap (12) across the animal's back. This further padding softens and distributes pressure without requiring larger hardware, such as length adjusters and buckles. The ends of the chest strap (11) and/or the withers strap (12) can be smaller than the center portion and adjustable, thereby minimizing pressure while allowing for appropriate sized hardware for the size of the animal. These embodiments are appropriate, in particular, for toy dog breeds where small sized hardware is appropriate but the accompanying narrow straps can place undue pressure on various parts of the body such as the trachea and/or larynx.

Other embodiments provide an additional neck strap attached to the chest strap (11). The neck strap prevents the pull of a leash (20) from shifting the chest strap (11) downward and accomplishes this without placing pressure on the trachea or larynx. Again, these embodiments can be suitable especially for toy dog breeds that have difficulties wearing collars because of such pressure.

FIG. 8 illustrates certain additional embodiments of the present invention. In FIG. 8, an animal harness (10) as described previously herein further comprises one or more pads (30) attached to the animal harness (10). The pads (30) shown in FIG. 8 are attached to the chest strap (11), one on either side of the leash connector (15) optionally between the leash connector (15) and length adjuster (18). Each pad (30) is attached to the chest strap (11) such that the pad (30) is disposed between the chest strap (11) and the animal when the animal harness (10) is being worn. Pads (30) may alternatively or additionally be attached to the girth and/or back straps.

FIG. 9 illustrates, in a side view, an additional optional pad (30) attached to the withers strap (12), also disposed between the animal and the withers strap (12). FIG. 10 illustrates a single pad (30) for the chest strap (11) that encompasses an area similar to that of the two pads (30) in FIG. 8. In these embodiments, the leash connector (15) does not necessarily connect two sides of the chest strap (11) but instead may be slidably or fixedly attached to the chest strap (11), as shown, and the single pad (30) is centered on the middle of the chest strap (11). Various embodiments of the present invention include only the pad (30) attached to the withers strap (12), or only include the one or two pads (30) on the chest strap (11), or any other combination of the pads (30) illustrated in FIGS. 8-10. As used herein, the term "slidably" is meant to indicate that a connection is made in a manner that allows for movement (sliding) of the connection. The term "fixedly" is meant to indicate that a connection is made at fixed positions relative to the connected objects.

Another optional feature illustrated by FIGS. 8-10 is one or more extra leash connector (32). One or more leash connector (32) can be included on the animal harness (10) with or without the pads (30). The leash connector (32) can encircle the chest strap (11), in some embodiments, as shown. Optionally, a leash connector (32) may be fixedly or slideably attached to the chest strap (11) on one or both sides of the leash connector (15) between the leash connector (15) and length adjuster (18).

FIG. 10 illustrates still additional embodiments of the present invention. In FIG. 10, an animal harness (10) as described previously herein further comprises a neck strap (34) that optionally is also padded, as illustrated. Each end of the neck strap (34) connects to the chest strap (11) on opposite sides of the middle of the chest strap (11), between the side connectors (14) and leash connector (15). The ends of the neck strap (34) can be joined to the chest strap (11) be stitching, loops, hooks, rings snaps, clips and/or the like. In some embodiments, the ends of the neck strap (34) are connected to the chest strap (11) such that they can slide along the chest strap (11). For example, the neck strap (34) may include loops through which the chest strap (11) slidably passes. The positions at which the neck strap (34) connects to the chest strap (11) is optionally adjustable. In some embodiments, ends of the neck strap are attached to the leash connector (15). The neck strap (34) goes around the neck of the animal above the withers strap (12), e.g., between the withers strap (12) and the head of the animal. The neck strap (34) optionally also include a releasable connector (36) and length adjuster (18), as illustrated.

The neck strap (34) prevents the pull of a leash (20) from shifting the chest strap (11) downward or sagging downward. The neck strap (34) does so without placing pressure over the trachea or larynx. Specifically, when a leash connected to the leash connector (15) is pulled neither the chest strap (11) nor the neck strap (34) press on the trachea or larynx. This is because the neck strap (34) only partially surrounds the neck and/or is held away from the trachea and larynx by the chest strap (11). This is in contrast with connection of a close fitting collar to the chest strap (11) which has the potential of applying pressure to the trachea or larynx. In some embodiments, the neck strap (34) is configured to prevent the leash connector (15) from moving below the forechest of the animal, i.e., below a level at which the legs of the animal meet the chest of the animal. In some embodiments, the neck strap (34) is configured to position the chest strap (11) in approximately a horizontal position when the animal is standing.

In some embodiments the neck strap (34) is connected to the withers strap (12). This connection can be by a connector disposed approximately at the spine of the animal. For example, the neck strap (34) and the withers strap (12) may be connected by a strap (not shown) configured to lay along the spine of the animal. In some embodiments, the neck strap (34) and the withers strap (12) come in contact.

Although the above description is specific, they should not be considered as limitations on the scope of the invention, but only as examples of the embodiments. Many substitutes and variations are possible within the teachings of the invention. For example, the harness may be used with a collar or without the leash by grabbing the chest strap and pulling it in the appropriate direction. A collar may be considered as being comprised of a chest strap and a withers strap. The buckles may be replaced with hook-and-loop fasteners. A different harness may be provided for securing the leash connector at the chest of the animal. Therefore, the scope of the invention should be determined by the appended claims and their legal equivalents, not by the examples given.

What is claimed is:

1. An apparatus, comprising:
   a chest strap configured to be positioned across a forechest of an animal across its shoulders;
   a back strap configured to be positioned across a back of the animal at or behind its shoulders;
   a girth strap configured to be positioned across a girth of the animal behind the front legs on an underside of the animal, wherein respective opposite ends of the chest strap, the back strap, or the girth strap are connected together on each of the right and left sides of the animal and the straps are of such relative length so as to place the connections at or behind the shoulders of the animal;
   a leash connector attached to an intermediate position of the chest strap and configured for applying a rotational force to the shoulders of the animal when the animal moves forwards of a handler and pulls on the leash connector; and
   a neck strap configured to be positioned across the neck of the animal and to be connected to the chest strap.

2. The apparatus of claim 1, further comprising a second leash connector attached to the chest strap.

3. The apparatus of claim 1, further comprising a padding configured to be disposed between the leash connector and the animal.

4. The apparatus of claim 1, wherein the neck strap is configured to support the chest strap without placing pressure on a trachea or larynx of the animal.

5. The apparatus of claim 1, wherein the neck strap is configured to only partially surround the neck of the animal.

6. The apparatus of claim 1, wherein the neck strap includes a length adjustor.

7. An apparatus comprising:
   a harness configured to be attached proximate to the shoulders of an animal; and
   a leash connector attached to the harness such that the leash connector is disposed proximate to the chest of the animal below the neck and forward of the forelegs of the animal, the leash connector being prevented from moving above the neck of the animal by the harness, the leash connector being prevented from moving behind the forelegs of the animal by the harness, the leash connector being prevented from moving below the forechest of the animal by the harness, the harness being configured to apply pressure to the shoulders of the animal in response to tension on a leash connected to the leash connector.

8. The apparatus of claim 7, further comprising a neck strap configured to support the chest strap without placing pressure on a trachea or larynx of the animal.

9. The apparatus of claim 7, further comprising a neck strap configured to only partially surround the neck of the animal.

10. An apparatus comprising:
    a forechest strap configured to extend from a first connection to a second connection and to be positioned across a chest of an animal between a neck and front legs of the animal;
    a withers strap configured to extend from the first connection to the second connection and to be positioned across a withers of the animal behind the neck of the animal;
    a girth strap configured to extend from the first connection to the second connection and to be positioned across a girth of the animal behind the front legs of the animal,
    the first and second connections being vertically adjustable by independently changing lengths of both the withers strap and the girth strap,
    the first and second connections being horizontally adjustable by changing a length of the forechest strap;
    a neck strap configured to be positioned across the neck of the animal and to support the forechest strap; and
    a leash connector operatively coupled to the forechest strap and configured to connect a leash to the forechest strap.

11. The apparatus of claim 10, further comprising a second leash connector attached to the chest strap.

12. The apparatus of claim 10, wherein the neck strap is attached to the chest strap in a manner that allows the connection points to slide along the forechest strap.

13. The apparatus of claim 10, wherein the neck strap is connected to the leash connector.

14. The apparatus of claim 10, herein the neck strap is configured to support the chest strap without placing pressure on a trachea or larynx of the animal.

15. The apparatus of claim 10, wherein the neck strap is configured to only partially surround the neck of the animal.

* * * * *